July 23, 1946.  C. M. BOYD  2,404,615
BRAKE FOR HYDRAULIC MOTORS
Filed Aug. 5, 1944
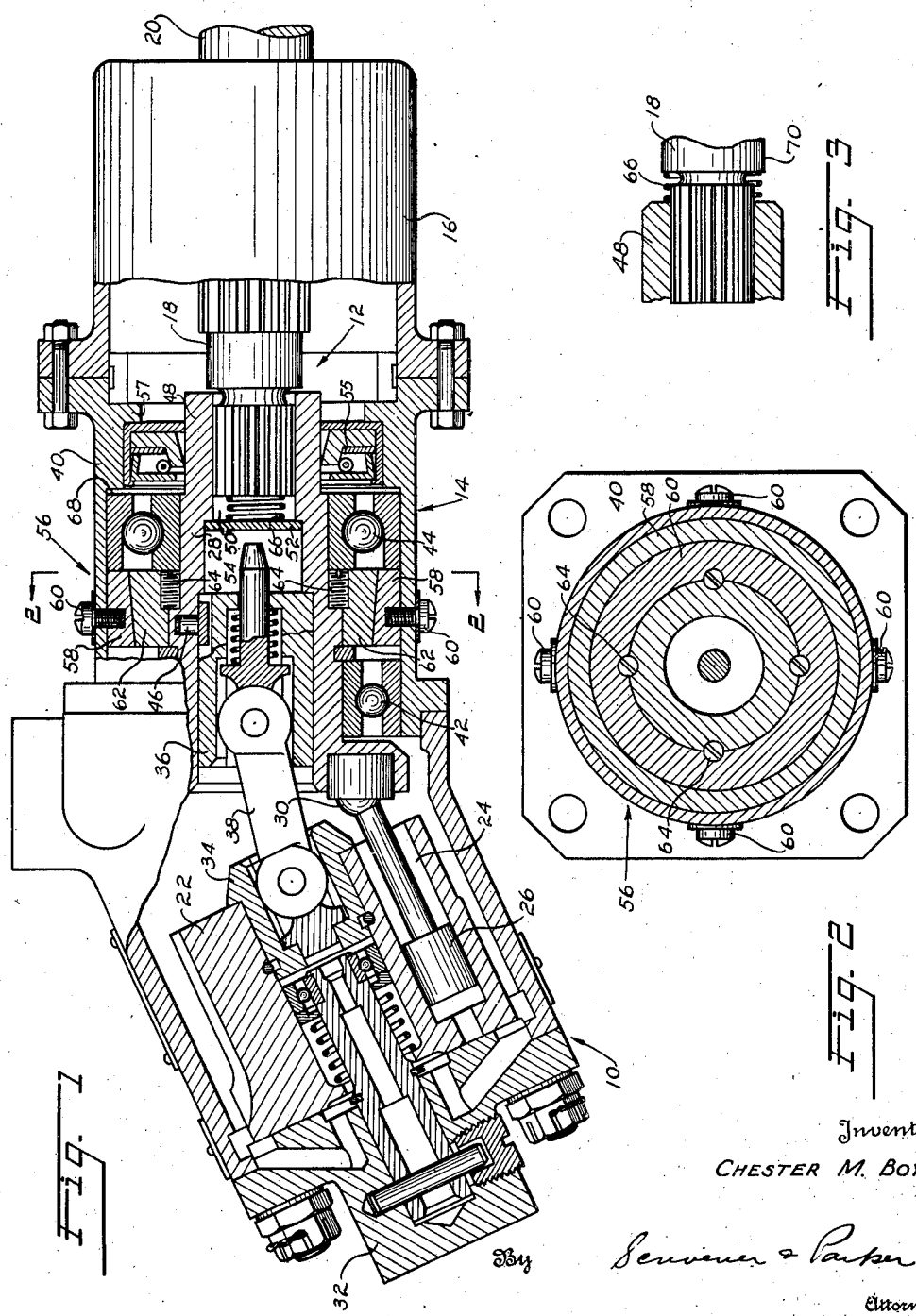
Inventor
CHESTER M. BOYD Patented July 23, 1946

2,404,615

UNITED STATES PATENT OFFICE 2,404,615

BRAKE FOR HYDRAULIC MOTORS

Chester M. Boyd, Silver Spring, Md., assignor to Engineering and Research Corporation, Riverdale, Md., a corporation of Maryland Application August 5, 1944, Serial No. 548,272

8 Claims. (Cl. 192—8)

This invention relates to a braking mechanism and more particularly to means for preventing rotation of the driven member of a hydraulically operated motor transmission apparatus, under certain conditions of operation.

In installations with which the present invention is concerned, a driven mechanism is rotated by a hydraulic motor of well-known type, the latter comprising a rotatable cylinder block housing an annular series of pistons, the latter and block being so connected with the driven member as to rotate the latter and thus operate any suitable device connected thereto. Reciprocation of the pistons and hence rotation of the block is achieved through the admission and exhaust of fluid under pressure, in a well-known manner.

Transmission mechanisms of the foregoing type have been employed for operating various devices, as for example, to elevate and depress aircraft guns and gun turrets. When used for the latter purpose, however, it has been found that when the fluid supply to the motor is interrupted, and the rotation of the fluid motor ceases, the gun turret does not remain fixed in the position to which it has been moved. On the contrary, the turret turns slowly or creeps about its horizontal axis, this action resulting in a slight rotation of the cylinder block with accompanying movement of the pistons. This is due to the weight of the guns and may be also caused by wind pressure acting on the guns and turret when the aircraft is in flight. Such creeping of the turret and the guns carried thereby is highly undesirable because of the loss of time to get on the target when the guns are fully depressed. Furthermore, with the guns depressed, there is the danger of the guns falling against the airplane structure.

It is accordingly one of the objects of the present invention to provide a hydraulic drive mechanism which may be especially adapted, though not limited thereto, for power operation of aircraft gun turrets and which is so constituted as to avoid the creeping condition heretofore referred to.

A further object of the invention is to provide a novel drive unit of the foregoing type which is entirely automatic in its operation and function of checking or arresting any creeping tendency of the turret, once it has been adjusted to the desired position and the power to the motor is interrupted.

Another object comprehends an arrangement of the above character which includes a brake mechanism for effectively preventing any movement of the driven mechanism, once the rotation of the motor is arrested.

Still another object resides in the utilization of the end thrust inherent in fluid motors of the rotary cylinder block, reciprocating piston type, for automatically controlling a brake mechanism.

A still further object resides in a novel construction and arrangement of a brake of the above character, whereby its installation in drive mechanisms of the present commercial type, may be quickly and easily effected thus avoiding any necessity of expensive re-design and reconstruction of such mechanisms.

Other objects and features of novelty of the invention will appear more fully hereinafter from a consideration of the following detailed description when taken in connection with the accompanying drawing, wherein two forms of the invention are illustrated. It is to be expressly understood, however, that the drawing is utilized for purposes of illustration only and is not to be taken as a definition of the limits of the invention, reference being had for this latter purpose to the appended claims.

In the drawing, wherein similar reference characters refer to similar parts throughout the several views, Fig. 1 is an axial view partly in section of a hydraulic drive mechanism constructed in accordance with the present invention and illustrating one embodiment;

Fig. 2 is a transverse sectional view taken along lines 2—2 of Fig. 1, and

Fig. 3 is a fragmentary view partly in section of a different embodiment of the invention.

Referring more particularly to Fig. 1, the present invention is illustrated therein as including a fluid pressure operated motor 10, a driven mechanism 12, and driven apparatus 14 interconnecting the motor and the mechanism. The latter is illustrated diagrammatically as including a transmission casing 16 having input and output shafts 18 and 20 respectively, the latter being connected with any device it is desired to operate. The present invention contemplates the connection of the output shaft 20 with an aircraft gun or gun turret, the arrangement being such that controlled movement of the shaft effects operation of the turret to move the latter and the guns carried thereby in a vertical plane. If desired, the turret and guns may be moved in any desired plane, the invention not being limited to movement in a vertical plane. Also, it will be readily understood that the output shaft may be connected to operate any device and that the invention is not limited to control of the movement of a gun turret.

The hydraulically operated motor 10 is of the well-known type which includes a rotary cylinder block 22 having an annular series of cylinders 24 therein, each of said cylinders housing pistons 26, the ends of the latter being suitably connected to a driven member or barrel 28 as by means of connecting rods having ball and socket joints 30. As shown, the motor 10 and barrel 28 are angularly related in a manner common to this type of motor, it being understood that fluid under pressure is supplied to and exhausted from the series of cylinders through inlet and exhaust ports located in the valve plate 32, in order to effect reciprocation of the pistons and consequent rotation of the block 22. The latter is provided with a retainer 34 which is drivably connected with a retainer 36 carried by the driven barrel 28, as by means of a master connecting rod comprising a universal link and pin construction 38. From this arrangement, it will be readily perceived that rotation of the block 22 will effect rotation of the barrel 28, the speed of operation of the latter being dependent upon the degree of fluid pressure admitted to the motor.

The foregoing construction is typical of several well-known types embodying a rotary cylinder block with a series of reciprocating pistons, the motor and driven member being angularly rotated. It is hence pointed out that the motor illustrated is exemplary only, and that the invention is not limited to the specific details shown.

The driven apparatus more particularly includes a housing 40, suitably secured at its opposite ends to the transmission casing 16 and the motor 10, respectively, and within which a pair of spaced-apart bearings 42 and 44 are positioned, for rotatably supporting the driven barrel 28. The retainer 36 is secured to the barrel 28 in any suitable manner, as by a key 46, in order to impart rotation thereto when the motor 10 is operating. The outer end of the driven member 28 is formed as a cup-shaped extension 48 having a series of longitudinally extending splines 50 with which the exteriorly splined shaft 18 cooperates in order to drivably connect these parts. As shown, a plate 52 closes the open end of the extension 48, the plate being fixed in the position illustrated, by any suitable means, such as a press fit with the wall of chamber 54. In order to prevent seepage of oil along the outer surface of the barrel extension 48 any suitable type of oil seal 55 may be provided, the seal being maintained in position as by an internal flange 57 formed on the outer end portion of the housing 40.

In the operation of the construction thus far described, it will be seen that rotation of the cylinder block 22 will cause rotation of the driven member 28 and operation of the input and output shafts 18 and 20 in a well-known manner, so long as fluid pressure is supplied to and exhausted from the motor 10. However, as heretofore pointed out, in the event the drive unit is employed for operation of a gun turret or other mechanism it has been found that when the supply of fluid pressure to the motor is interrupted, the driven mechanism will not remain in its then adjusted or static position but will creep. This creeping is accompanied by rotation of the shaft 18, barrel 28 and motor cylinder block 22 and is caused by leakage of fluid past the pistons 26.

The present invention provides means for overcoming the aforesaid creeping of the actuated mechanism and as shown, takes the form of a brake mechanism 56 which is entirely automatic in its operation. Such automatic operation is achieved by utilizing the end thrust of the hydraulic motor in a novel and efficient manner, it being understood that in the type of motor with which the present invention is illustrated, the driven barrel is subjected to an endwise axial thrust during motor operation, due to the reciprocation of the pistons 26.

More particularly, the brake mechanism comprises an outer steel cone-shaped member 58, fixed to the housing, as by means of a plurality of set screws 60 and an inner bronze or brass cone-shaped member 62, secured to the driven barrel 28 by a plurality of set screws 64. The tapered mating surfaces of these brake members are identical as to angularity, and such surfaces are maintained in frictional engagement, as illustrated, by means such as a spring 66 interposed between the plate 52 and the adjacent end of shaft 18, whenever rotation of the motor 10 ceases. Under these conditions the spring 66 is effective to shift the barrel 28, bearing 44 and brake member 62 to the left, as viewed in Fig. 1, in order to effect such frictional engagement. Such movement is in a direction opposite to that maintained when the motor is operating in response to the application of fluid pressure thereto. On the other hand, as soon as motor 10 begins to operate, in response to the application of fluid pressure thereto, the end-wise thrust due to the reciprocation of the pistons 26 will shift the retainer 36, driven barrel 28, brake member 62 and bearing 44 in the opposite direction, thus automatically disengaging the brake and allowing free rotation of the barrel 28 and driven parts connected thereto. It will be observed that the degree of taper on the cooperating surfaces of the brake members 58 and 62 is relatively slight with respect to the axis of said members, so that an extremely slight end-wise movement of the brake member 62 will be sufficient to disengage the brake. In practice it has been found that such movement is of the order of a few thousandths of an inch and is inherently present in certain commercial hydraulic motors. However, for purposes of illustration, the axial travel of the parts above referred to, has been exaggerated and is represented at 68, the same being the space immediately to the right of the bearing 44.

A modified form of the invention is illustrated in Fig. 3 wherein the spring 66 is interposed between the outer end of the extension 48 and a flange or shoulder 70 on the input shaft 18. In this form, the spring moves the barrel 28 and brake member 62 to the left upon discontinuance of the driving force of the motor. In this form and also in the modification of Fig. 1, the springs 66 are so proportioned, that they will have slight spaces between the coils thereof when the driven assembly is shifted in response to the operation of the motor.

From the foregoing it will be readily perceived that as soon as the motor 10 begins to operate and exerts an end-wise thrust upon the retainer 36, the braking members 62 and 58 will become disengaged due to the thrust-responsive shift of the driven member 28 to the right. However, as soon as motor operation has ceased, the springs 66 in both Figs. 1 and 3 will shift the driven member 28 in the opposite direction and re-engage the brake 56 in order to effectively prevent any rotation of the driven member 28 in either direction, it being understood that under these conditions, the brake member 62 is frictionally engaged with the stationary brake member 58. Thus, any tendency for the driven mechanism connected with the output shaft 20, to creep, is effectively overcome.

While two embodiments of the invention have been illustrated and described herein, it will be readily understood that the invention is not limited thereto but may take other forms without departing from the spirit of the invention. Reference will therefore be had to the appended claims for a definition of the limits of the invention.

I claim:

1. A fluid pressure operated transmission device comprising a fluid pressure operated rotary motor of the type having a rotatable cylinder block including a plurality of reciprocable pistons, a rotary driven member drivably and angularly connected with said block and pistons and movable axially in one direction by force exerted thereon due to rotation of said motor, means for moving said member in the opposite direction upon discontinuance of said axial force, and braking means for arresting rotation of said member when said member is moved in said opposite direction and for releasing said member when the latter is moved in said one direction.

2. A fluid pressure operated transmission device comprising a fluid pressure operated motor of the type having a rotatable cylinder block including a plurality of reciprocable pistons, a rotary member angularly and drivably connected with said block and pistons, means to supply fluid pressure to said block whereby the latter rotates said member and moves the same a slight axial distance, braking means associated with said rotary member and operable to release said member upon such axial movement thereof and means constantly urging said rotary member in the opposite axial direction whereby said braking means are moved into braking position upon cessation of rotation of said block.

3. A fluid pressure operated transmission device comprising a fluid pressure operated motor of the type having a rotatable cylinder block including a plurality of reciprocable pistons, a rotary driven member angularly and drivably connected to said block and pistons and movable a slight axial distance in one direction due to force exerted thereon by rotation of said block, braking means comprising normally engaged stationary and rotatable elements, said rotatable element being connected to said driven member and movable out of braking engagement with the stationary element upon said slight axial movement of said member in one direction.

4. A fluid pressure operated transmission device comprising a fluid pressure operated motor of the type having a rotatable cylinder block including a plurality of reciprocable pistons, a rotary member angularly and drivably connected with said block and pistons, means to supply fluid pressure to said block whereby the latter rotates said member and moves the same a slight axial distance, braking means comprising a fixed braking member and a braking member carried by and movable axially and rotatably with said rotary member whereby said braking members are moved into released position upon such axial movement of said rotary member and are moved oppositely into braking engagement upon movement of said rotary member in the opposite axial direction as by cessation of rotation of said block.

5. A fluid pressure operated transmission device comprising a fluid pressure operated rotary motor of the type having a rotatable cylinder block including a plurality of reciprocable pistons, a rotary driven member angularly and drivably connected with said block and pistons and movable a slight axial distance in one direction due to force exerted thereon by rotation of said motor, braking means comprising normally engaged stationary and rotatable elements, said rotatable element being connected to said driven member and movable out of braking engagement with the stationary element upon said slight axial movement of said member in one direction, and resilient means operable to move said elements into braking engagement when the force due to rotation of said motor and tending to move said driven member axially is discontinued.

6. A fluid pressure operated transmission comprising a fluid pressure actuated rotary motor of the type having a rotatable cylinder block including a plurality of reciprocable pistons, a rotary driven member angularly and drivably connected with said block and pistons and movable axially in one direction by force exerted thereon by rotation of said motor, resilient means for moving said member in the opposite direction upon cessation of the axial force exerted thereon by motor rotation, a casing surrounding said driven member, and a pair of annular braking elements within the casing arranged concentrically of the driven member, one of said elements being secured to the casing and the other element being secured to the driven member, said elements being positioned to be frictionally engaged upon movement of said member in said opposite direction and to be moved out of frictional engagement when said member is moved in said one direction.

7. A fluid pressure operated transmission device comprising a fluid pressure actuated rotary motor of the type having a rotatable cylinder block including a plurality of reciprocable pistons, a rotary driven member angularly and drivably connected with said block and pistons and movable axially in one direction by force exerted thereon by rotation of said motor, a cup-shaped extension on said driven member, a driven mechanism having a shaft received within said extension and drivably connected thereto, braking means comprising a pair of normally-engaged braking cones disengageable upon such axial movement and which are respectively fixed and carried by said driven member, and a spring interposed between the bottom of said extension and the end of said shaft and constantly urging said driven member axially in the opposite direction whereby upon discontinuance of motor rotation said braking cones are moved into frictional engagement to prevent rotation of the driven member and mechanism in either direction.

8. A fluid pressure operated transmission device comprising a fluid pressure actuated rotary motor of the type having a rotatable cylinder block including a plurality of reciprocable pistons, a rotary driven member angularly and drivably connected with said block and pistons and movable axially in one direction by force exerted thereon by rotation of said motor, a driven mechanism having a shaft drivably connected with said member, a flange on said shaft, braking means comprising a pair of normally-engaged braking cones disengageable upon such axial movement and which are respectively fixed and carried by said driven member, and a spring interposed between said driven member and flange and constantly urging said driven member axially in the opposite direction whereby upon discontinuance of motor rotation said braking cones are moved into frictional engagement to prevent rotation of the driven member and mechanism in either direction.

CHESTER M. BOYD.